(12) United States Patent
Hinojosa et al.

(10) Patent No.: US 11,414,101 B1
(45) Date of Patent: Aug. 16, 2022

(54) SYSTEMS AND METHODS FOR AUTOMATIC SHELTERING IN STORMS

(71) Applicant: UIPCO, LLC, San Antonio, TX (US)

(72) Inventors: Cynthia Ann Hinojosa, Selma, TX (US); Andrew Jacob Contreras, San Antonio, TX (US); Lemont Williamson, San Antonio, TX (US); Igor Alexandre Gregorio, San Antonio, TX (US); Stephen Anthony Young, Boerne, TX (US); Jonathan Edward Seaton, San Antonio, TX (US); Chris Aaron Bodden, San Antonio, TX (US); Shirley Elizabeth Bunton, San Antonio, TX (US); Shayna Dickson, Boerne, TX (US); Ric M. Pena, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 45 days.

(21) Appl. No.: 17/038,001

(22) Filed: Sep. 30, 2020

(51) Int. Cl.
  *B60W 60/00*   (2020.01)
  *B60W 40/02*   (2006.01)
  *E04H 6/02*    (2006.01)

(52) U.S. Cl.
  CPC ........ *B60W 60/0016* (2020.02); *B60W 40/02* (2013.01); *E04H 6/025* (2013.01); *B60W 2420/42* (2013.01); *B60W 2420/52* (2013.01); *B60W 2420/54* (2013.01); *B60W 2555/20* (2020.02)

(58) Field of Classification Search
  CPC ............. B60W 60/0016; B60W 40/02; B60W 2555/20; B60W 2420/42; B60W 2420/52; B60W 2420/54; E04H 6/025
  See application file for complete search history.

(56) References Cited

U.S. PATENT DOCUMENTS

| 10,255,782 | B1 * | 4/2019 | Ghannam | G08B 21/20 |
| 2011/0118897 | A1 * | 5/2011 | Menard | B60J 7/0573 |
| | | | | 701/1 |
| 2018/0032082 | A1 * | 2/2018 | Shalev-Shwartz | |
| | | | | G01C 21/3602 |
| 2018/0194343 | A1 * | 7/2018 | Lorenz | G08G 1/168 |
| 2019/0202463 | A1 * | 7/2019 | Anderson | G05D 1/0088 |
| 2020/0142419 | A1 * | 5/2020 | Pohl | G05D 1/0274 |

\* cited by examiner

*Primary Examiner* — Yazan A Soofi
*Assistant Examiner* — Naeem Taslim Alam
(74) *Attorney, Agent, or Firm* — Plumsea Law Group, LLC

(57) ABSTRACT

Systems and methods for mitigating damage caused by hail storms to self-driving motor-vehicles. When a self-driving motor vehicle determines or learns that a hail storm or other severe weather event may be approaching, it may seek cover under a protective structure or some other location where it might not be as exposed to the severe weather event. Depending upon the availability of suitable shelters, the self-driving motor vehicle might, for example, obtain a list of such possible shelters and apply certain factors to develop a priority list as to which shelters to seek. The self-driving motor vehicle may then drive itself to the location and remain there at least for the duration of the hail storm or other event. In some cases, the self-driving motor vehicle may evaluate the adequacy of the protective structure or other location, and may decide to seek a better protective structure or location.

20 Claims, 15 Drawing Sheets

SYSTEMS AND METHODS FOR AUTOMATIC SHELTERING IN STORMS

TECHNICAL FIELD

This disclosure relates generally to systems and methods for mitigating the damages caused by storms such as hail storms or other severe weather events.

BACKGROUND

Severe hail storms or other types of severe weather may cause widespread damage to motor vehicles. As a general rule, in many cases even when the motor vehicle's owners receive a weather alert that a hail storm (or other severe weather) may be approaching, the owners may not be able to reach their automobiles in time to drive them into a protective structure. When a hail storm does hit, the damage to automobiles, in particular, may be extensive, because the exposed skyward-facing metal surfaces of automobiles are especially susceptible to substantial damage due to hail pelting down on the automobiles, even though many other structures or objects may not suffer any actual damage. Typically, the hail will leave dimples and dents all over the exposed skyward-facing automobile surfaces. Unfortunately, because the dimples and dents are typically distributed over almost all of the top exterior surfaces of the automobiles, repairing the damage is very expensive, since doing so would require replacing all of the damaged automobile components. In addition to the damage, repairing the automobiles would normally require the automobiles to spend as much as a week or more in the body repair shop. Thus hail storms often result in a very large number of relatively expensive claims to insurance companies, as well as becoming a major inconvenience to the automobile owners.

For those reasons, there is a need to mitigate as much as possible the damage to automobiles caused by severe hail storms or other severe weather.

SUMMARY

In one aspect, embodiments include a system for mitigating damages caused by severe weather comprising a self-driving motor vehicle that includes both a self-driving system and an analysis unit. The self-driving motor vehicle includes at least one of a video camera and a recording microphone. The self-driving motor vehicle also includes at least one navigating unit for navigating through traffic. The self-driving motor vehicle is configured to drive itself to a potential sheltered location upon learning of an arrival of severe weather. When the self-driving vehicle has arrived at the potential sheltered location, the analysis unit is configured to analyze at least one of images captured by the camera and sounds recorded by the recording microphone in order to determine whether the sheltered location provides adequate shelter for the self-driving motor vehicle. Furthermore, the analysis unit is configured to direct the self-driving system to drive the self-driving motor vehicle from the potential sheltered location to a more protective shelter whenever the analysis unit determines that the potential sheltered location provides inadequate shelter.

In another aspect, embodiments include a method for mitigating damages from severe weather to self-driving motor vehicles comprising providing a self-driving motor vehicle equipped with a LIDAR unit and a navigation apparatus and directing the self-driving motor vehicle to a potential sheltered location. The method further comprises providing at least one of a camera configured to capture images of the view above the motor vehicle and a recording microphone associated with the self-driving motor vehicle configured to record sounds from around the self-driving motor vehicle. The method further comprises providing an analysis unit configured to analyze at least one of the images captured by the at least one camera and the sounds recorded by the recording microphone, and to determine whether the motor vehicle is not being adequately sheltered at the potential shelter. Whenever the analysis unit is not being adequately protected at its present position, the analysis unit directs the self-driving motor vehicle to drive to an adequately protected location.

In yet another aspect, embodiments include a system for mitigating damage caused by severe weather comprising a self-driving motor vehicle that includes a LIDAR unit containing lateral-facing cameras on its roof. The system also includes an analysis unit in communication with a navigation unit in the self-driving motor vehicle and with a database of potentially protective shelters. The self-driving motor vehicle has at least one of an upwards-facing camera mounted in the LIDAR unit and a recording microphone. The self-driving motor vehicle is configured to monitor at least one of weather reports and weather alerts and to drive itself to a potential shelter whenever it learns of approaching severe weather. The analysis unit is configured to analyze at least one of images captured by the camera and sounds recorded by the recording microphone to determine whether the potential shelter provides adequate protection from the severe weather. When the analysis unit determines that the potential shelter is not adequate, it retrieves information from the database of potentially protective shelters, identifies a specific protective shelter that would provide adequate protection, and instructs the self-driving motor vehicle to drive itself to that specific protective shelter.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings, like reference numerals designate corresponding parts throughout the drawings.

DESCRIPTION OF EMBODIMENTS

Figure 1:
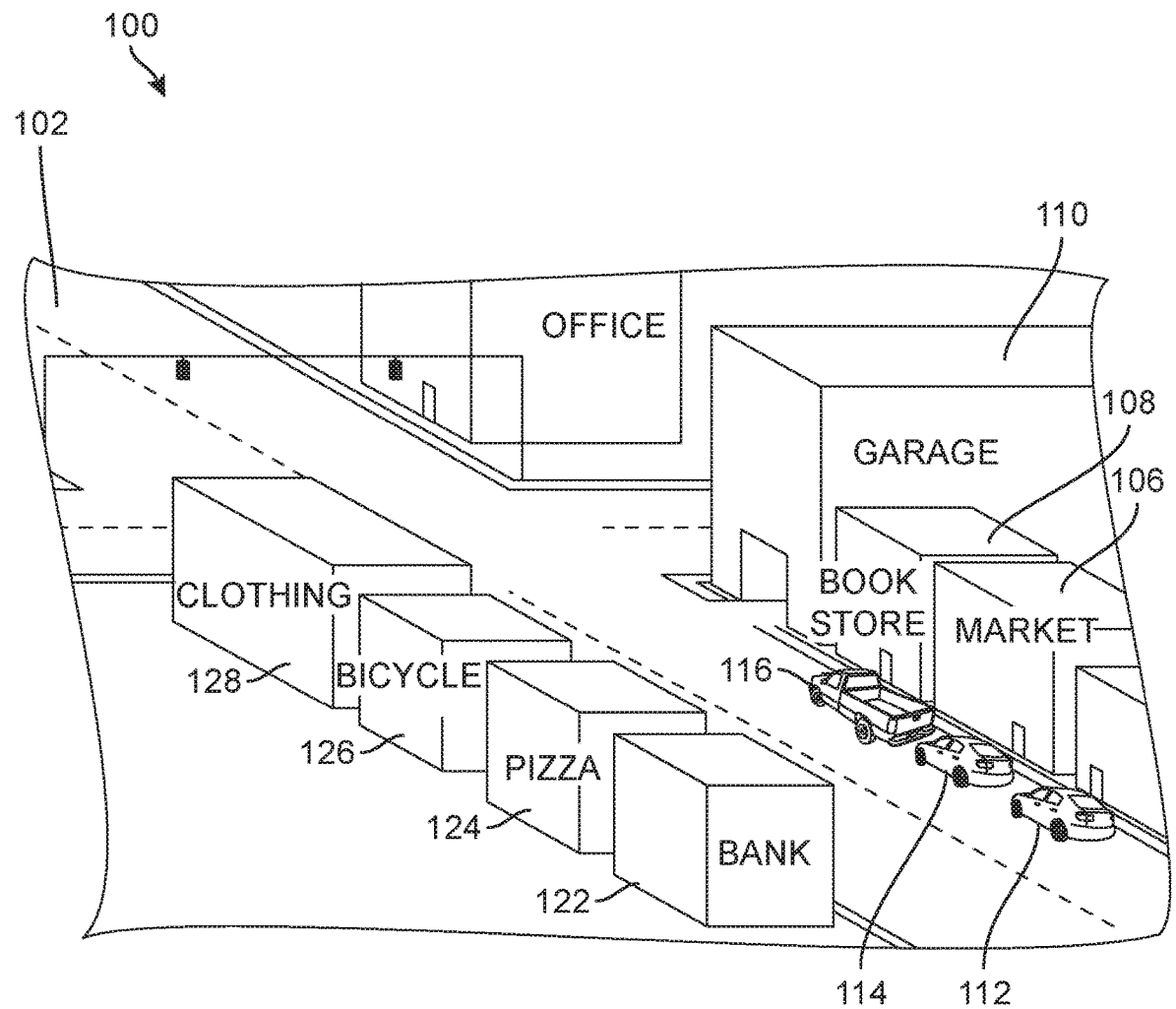
FIG. 1 is a perspective illustration of a typical street during good weather, with cars parked along one side of the street.

The embodiments disclosed herein provide systems and methods for mitigating damage caused by hail storms or other severe weather on self-driving motor vehicles such as self-driving cars, SUVs, trucks, vans, motorcycles and other motor vehicles. For example, when a self-driving car or other self-driving motor vehicle is informed that a hail storm may be approaching its location, or detects that a hail storm is approaching, it may seek cover under a protective structure such as a parking garage (unless it is already in a protective structure). Depending on the time available to find shelter and on the availability of suitable shelters, the self-driving car (or other motor vehicle) might, for example, obtain a list of possibly available shelters and apply certain factors to develop a priority list as to which shelters to try to enter. After entering a protective shelter, the car could stay in the shelter until the hail storm has passed and then return to its original location, if that is possible, or it may remain in the protective shelter. In any event, the car may then notify the car's owner of the car's location. In this way, damage to motor vehicles may be reduced, thus saving car owners and their insurance companies substantial repair expenses and inconveniences.

In some embodiments, the self-driving motor vehicle may evaluate the protection available at a shelter after it has arrived at that shelter. It may then determine that the shelter is inadequate. In that case, the self-driving car may then proceed to another location that provides better protection against the severe weather.

Although the description of embodiments is primarily presented in terms of hail storms, they are also applicable to other types of severe weather that may cause or result in damage to motor vehicles. For example, motor vehicles may be damaged during a tornado or cyclone by being hit by flying debris or even by being lifted then dropped or overturned. Motor vehicles may also be damaged by a flood or during a snow storm, for example. Except for flooding events, in each of these cases, it may be beneficial to move the motor vehicle into a sheltered protective parking structure, such as a parking garage. If the event is a potential flooding event, the motor vehicle could be protected from damage by being moved to a place that would not be flooded, such as to a higher street, to the top of a hill, or to an upper level of an above-ground parking garage, for example.

As used herein, the terms "cars" and "motor vehicles" are used interchangeably to include cars, SUVs, trucks, vans, motorcycles and other motorized vehicles. The term "car owner" shall mean the person in control of the motor vehicle, including, for example, in addition to the actual car owner, anyone the actual car owner has lent the car to (in which case, this person's mobile phone number should be entered into the car's system). The term "recording microphone" shall refer to a combination of a microphone and a recording device, such that sounds received by the microphone are recorded by the recording device. The terms "parking structure" and "parking garage" are used interchangeably to refer to any structure or building that provides covered or otherwise protected parking spaces for motor vehicles. The terms "prioritizing" and "ranking" shall have the same meaning and will be used interchangeably herein. The term "severe weather" shall mean weather that has the potential to cause or result in damage to motor vehicles, including hail storms, tornadoes, cyclones, floods and snow storms.

Furthermore, as used herein, the term "protective parking structure" shall include any structure or location where a motor vehicle would not be damaged by the particular severe weather event that is predicted. For example, the protected parking structure could be a public parking garage, an office, hotel, condominium, apartment building, other private or public parking facility, underneath trees or underneath a highway bridge when hail is predicted. When flooding is predicted, it could be an elevated location, such as an upper level of a multi-story above-ground parking garage or a higher-elevation street or hill, as compared to the original location of the motor vehicle. The terms "potentially sheltered location" and "potential shelter" shall refer to locations and shelters, respectively, that may or may not actually provide adequate protection. The term "target location" shall refer to any location that would mitigate damage in the event of the forecasted severe weather event, including for example, a parking garage, space under a bridge or under trees, or in the case of a flood, higher ground. The term "weather reporting system" shall refer to weather reporting channels or stations and weather alert systems, collectively.

Self-driving cars have already been developed and are being tested in selected urban and other environments. As the self-driving technology continues to be developed, it can be expected that self-driving cars may become less exceptional. In some cases, car owners may prefer to drive their cars themselves almost all the time, but may take advantage of the self-driving capability in specific circumstances, such as when the car owner is unable to drive, for example, or when a child needs to be picked up in an emergency. For that reason, the self-driving technology may become even more widespread than might otherwise be expected.

Self-driving cars may, for example, be controlled by a computer or other computing device housed, for example, in the trunk of the car, under a back seat, under a front seat, in the roof, or in some other inconspicuous location. The cars may use devices such as LIDAR (light detection and ranging) devices, radar devices, video cameras, still cameras, microphones and other sensors to monitor their environments, and to continually provide feedback to the computer as they drive along a highway, a street, or into a parking structure.

Because weather reporting systems such as stations or broadcasters, including local radio stations, local emergency notification systems, the Weather Channel, NOAA and the Red Cross's Emergency Alerts system and other such systems may be able to communicate with self-driving cars (either over the Internet or over a cell phone network) and alert cars before the approach of a possible hail storm, self-driving cars may be able to find shelter before being pummeled and damaged by hail during a hail storm. These sources of severe weather information may broadcast their warnings through the Internet, through weather channels or stations or alerts systems, or through other broadcast channels such as over radio, television or cable networks.

In addition, the self-driving cars may be able to detect the approach and/or the onset of a hail storm or other types of severe weather by analyzing data collected by onboard devices, such as video cameras and/or microphones. Furthermore, the cars may be able to use these same systems in order to check and evaluate the quality and adequacy of potential shelter after being directed to seek shelter in a specific location. If the self-driving cars evaluate the shelters as inadequate to protect the vehicle from damage, the cars will seek out the next closest adequate shelter.

FIG. 1 is a schematic perspective view 100 of a city street 102, showing motor vehicles 112, 114 and 116 parked on one side of the street. In this example, street 102 has a grocery market 106 and a book store 108 on one side of the street, and a bank 122, a pizza restaurant 124, a bicycle shop 126 and a clothing store 128 on the other side of the street. It also has a public parking garage 110 at the end of the block. At this time, the weather is clear, such that motor vehicle 112, motor vehicle 114 and motor vehicle 116 parked along the street are not being subjected to hail or any other type of severe weather.

Public parking garage 110 could be any garage that allows a motor vehicle to enter without having to pull a ticket from a machine. For example, it could be a municipal parking garage that does not charge for parking or it could be a municipal parking garage that has meters at each parking space. In a more general context, it could be a parking structure attached to a mall, for example.

Figure 2:
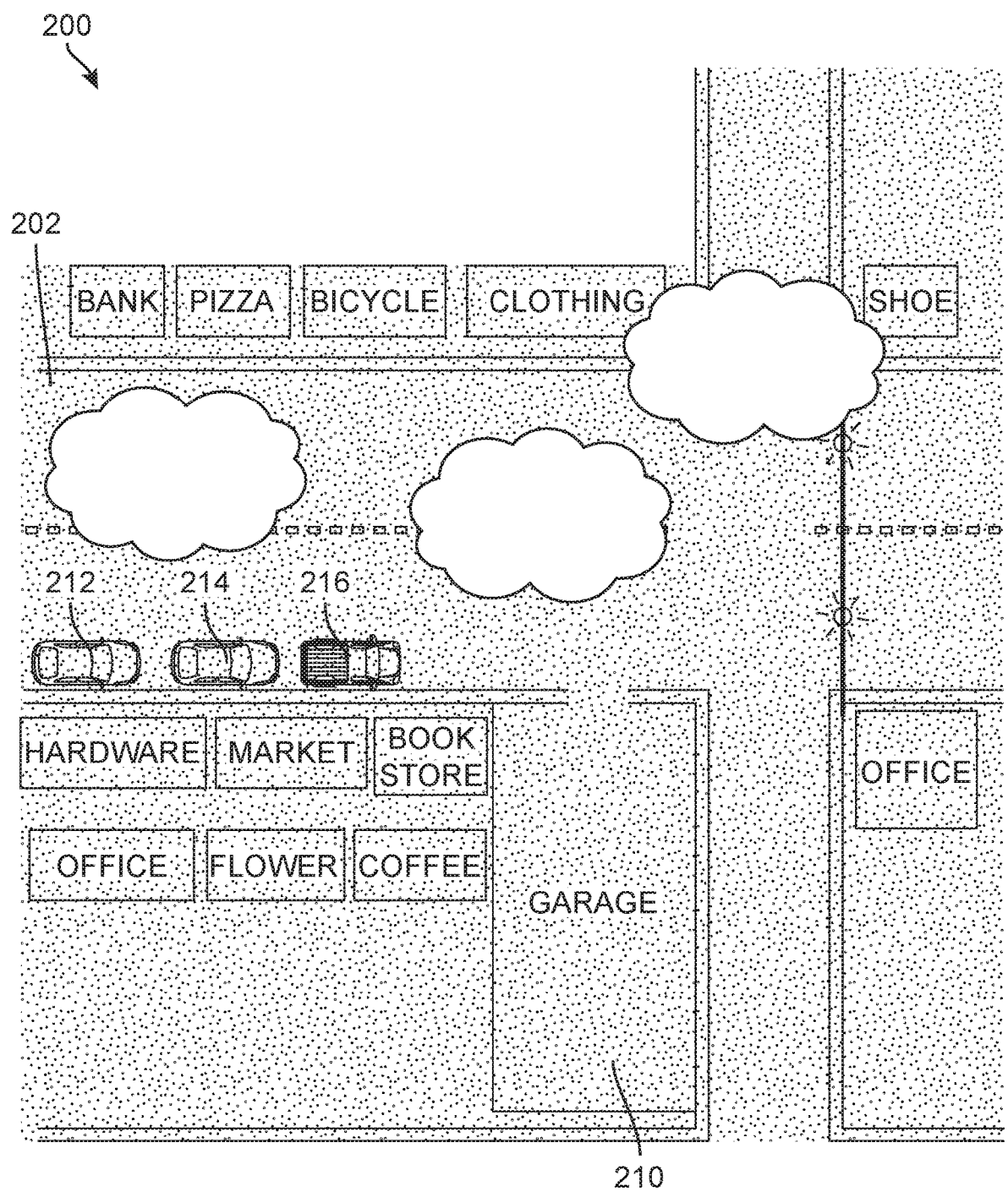
FIG. 2 is a plan view of the street of FIG. 1, during a hail storm.

FIG. 2 is a schematic plan view illustration 200 of hail pummeling the motor vehicles parked in a street, when a hail storm hits the area. Motor vehicle 212, motor vehicle 214 and motor vehicle 216 are parked on street 202 and do not move to get away as they are being pummeled with hail during the storm. Thus, all three vehicles parked on street 202 would suffer substantial damage during the duration of the storm, even though there may be available parking spaces in a nearby parking structure 210.

Figure 3:
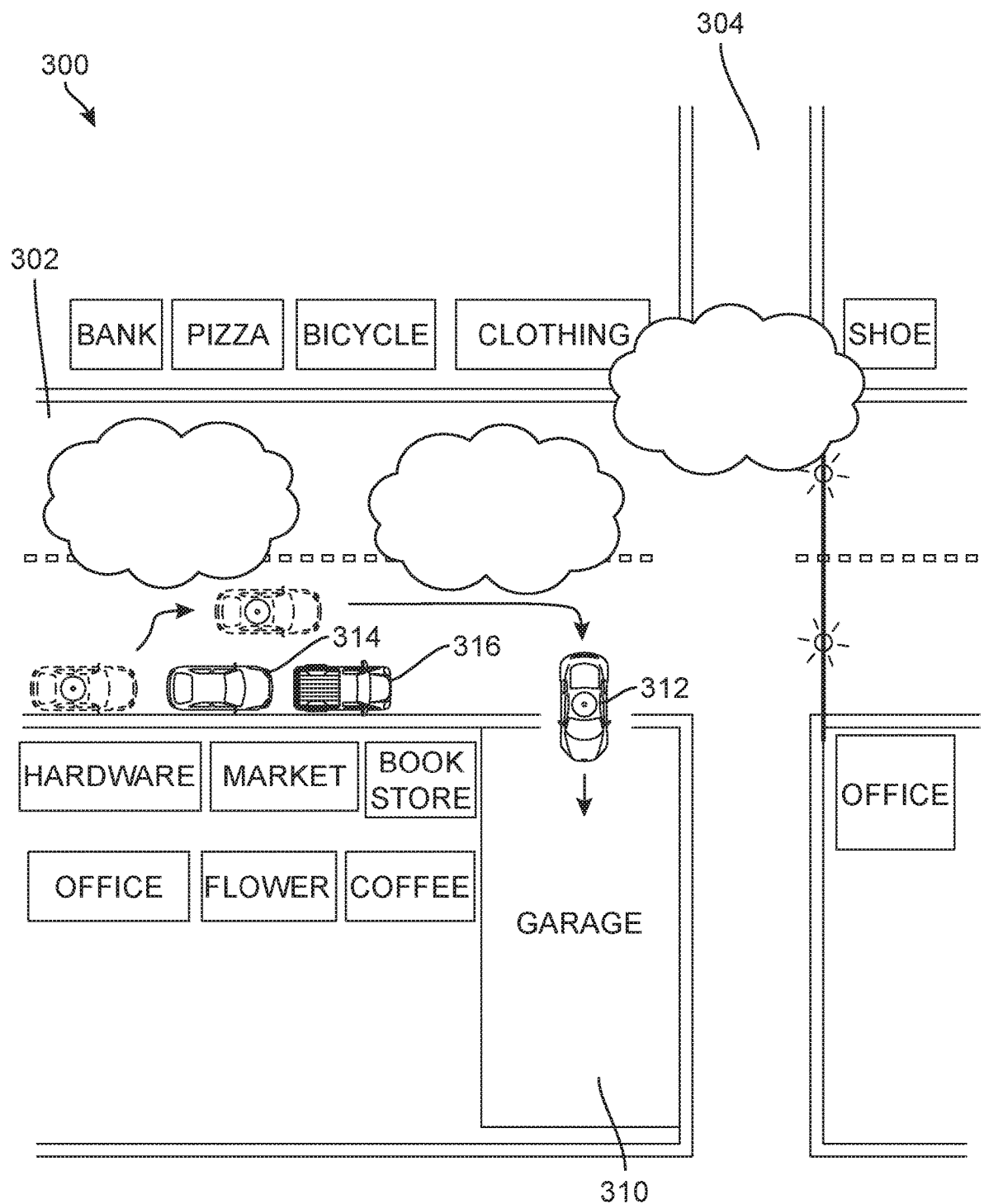
FIG. 3 is a plan view of the street of FIG. 2, showing a car driving to a parking garage prior to the arrival of a hail storm, in an embodiment.

Schematic diagram 300 shown in FIG. 3, is an illustration of a self-driving car 312 driving itself into a parking garage 310 upon being alerted that a hail storm is approaching. As shown in the schematic diagram of FIG. 3 and as described below with reference to FIG. 5, prior to the hail storm actually arriving, car 312 could drive itself from the street and into public garage 310, which is located nearby at the intersection of street 302 and street 304. As shown in FIG. 3 and described in greater detail below with reference to FIG. 6, self-driving car 312 may use one or more of LIDAR devices, video cameras, radar devices and microphones to guide the self-driving car down street 302 and into public garage 310. Car 314 and car 316, which in this example are not equipped with any hail avoidance apparatus, remain on street 302 and therefore may incur hail damage.

Figure 4:
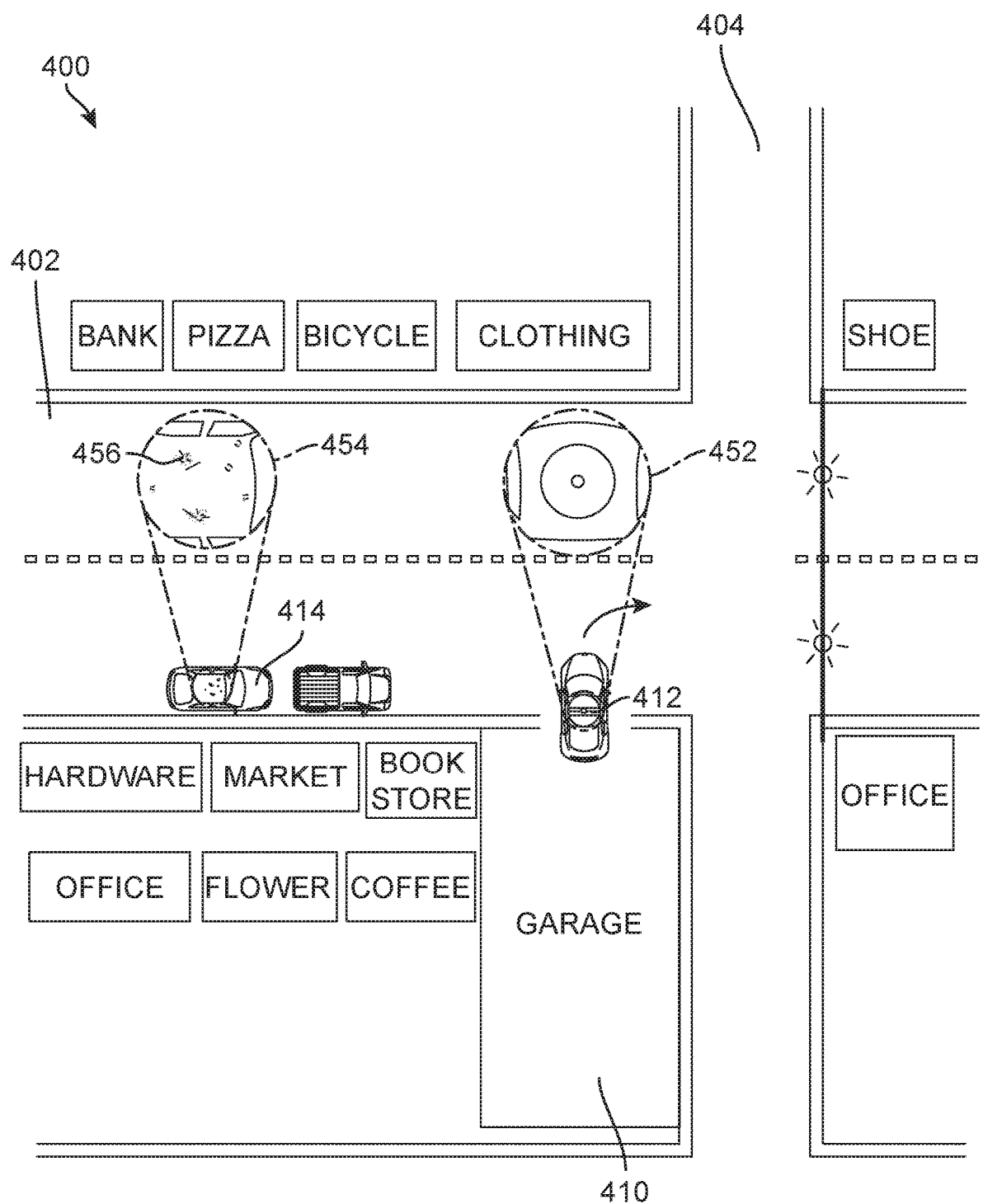
FIG. 4 is a plan view of the street of FIG. 3, with the car driving out of the parking garage after the storm is over, in an embodiment.

After the hail storm has passed, the car may learn from one of the weather alert services that the hail storm is over, or in some cases it may determine that on its own. For example, the car may be able to monitor the sound of the hail as it is hitting the street, or may be able to detect the cessation of hail impacts using one of its video cameras, as described below. FIG. 4 is a schematic illustration of the intersection of street 402 and street 404, which adjoin parking garage 410. Later on, the self-driving car may be driven out of the protected shelter of parking garage 410 by the car owner or may drive itself out of the parking garage 410 and back to a parking spot on the street. As shown in the illustration 400 of FIG. 4, because car 412 has been under the protection of the parking garage 410, its roof is undamaged, as shown in the blow-up of an undamaged section 452 of the roof of the car. However, car 414 that stayed in the street during the hail storm has received substantial damage to its roof as well as to other exposed surfaces of car 414, as shown by the blow-up of a damaged section 454 of its roof, showing dimples 456 caused by the hail striking the roof of car 414.

Figure 5:
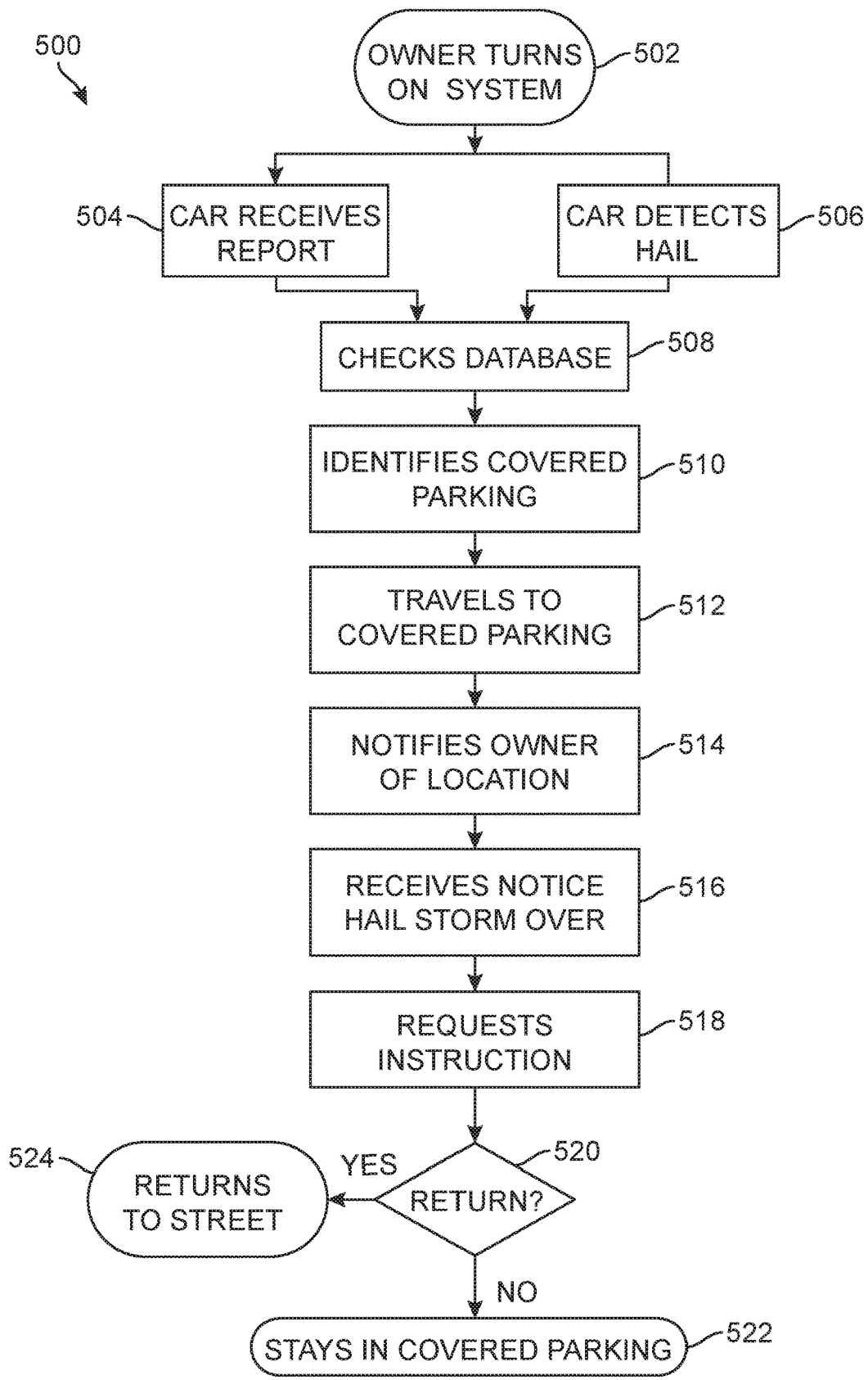
FIG. 5 is a flow chart showing an exemplary process that may be used to mitigate damage due to a hail storm, in an embodiment.

FIG. 5 is an exemplary flow chart 500 showing how a self-driving car may escape a hail storm in some embodiments. The process starts in step 502, when the owner of the car turns on an electronic device (shown in FIG. 11) that manages the hail storm avoidance process. Then, the car receives a report from a weather reporting system or a weather alert system that a hail storm is approaching in step 504 or detects the hail itself step 506. In either case, the car checks its database for possibly available covered parking structures in step 508 and identifies the location of a nearby covered parking structure in step 510. It then travels to the identified covered parking structure in step 512 and notifies the car owner of its location in step 514. When it receives notice that the hail storm is over (or determines that the storm has passed) in step 516 (which may be optional), it requests instruction from the owner in step 518 as to whether it should return to its original parking spot or stay in the parking structure. If at step 520, the instruction is to stay, it stays where it is in step 522. On the other hand, if the instruction is to return to its original parking spot, it returns to the street in step 524. Steps 516, 518, 520, and 524 shown in FIG. 5 are optional. The car could just stay in the covered parking, as indicated in step 522 after it has notified the owner of its location and of the identity of the available parking structure. Alternatively, it could skip steps 518, 520 and 524, and simply stay in the covered parking at step 522. Although step 516 is also optional, it could be included even if steps 518, 520 and 524 are not included.

The example illustrated in FIG. 5 assumes that there are parking spaces available in the covered parking structure, possibly because the database has data that shows that parking spots are generally available in that specific parking structure at that date and time. If the self-driving car does not know to a reasonable likelihood that parking spaces would be available in a specific parking structure, the exemplary procedure shown in flow chart 800 of FIG. 8 may be followed instead of the exemplary procedure illustrated in flow chart 500 of FIG. 5.

Figure 6:
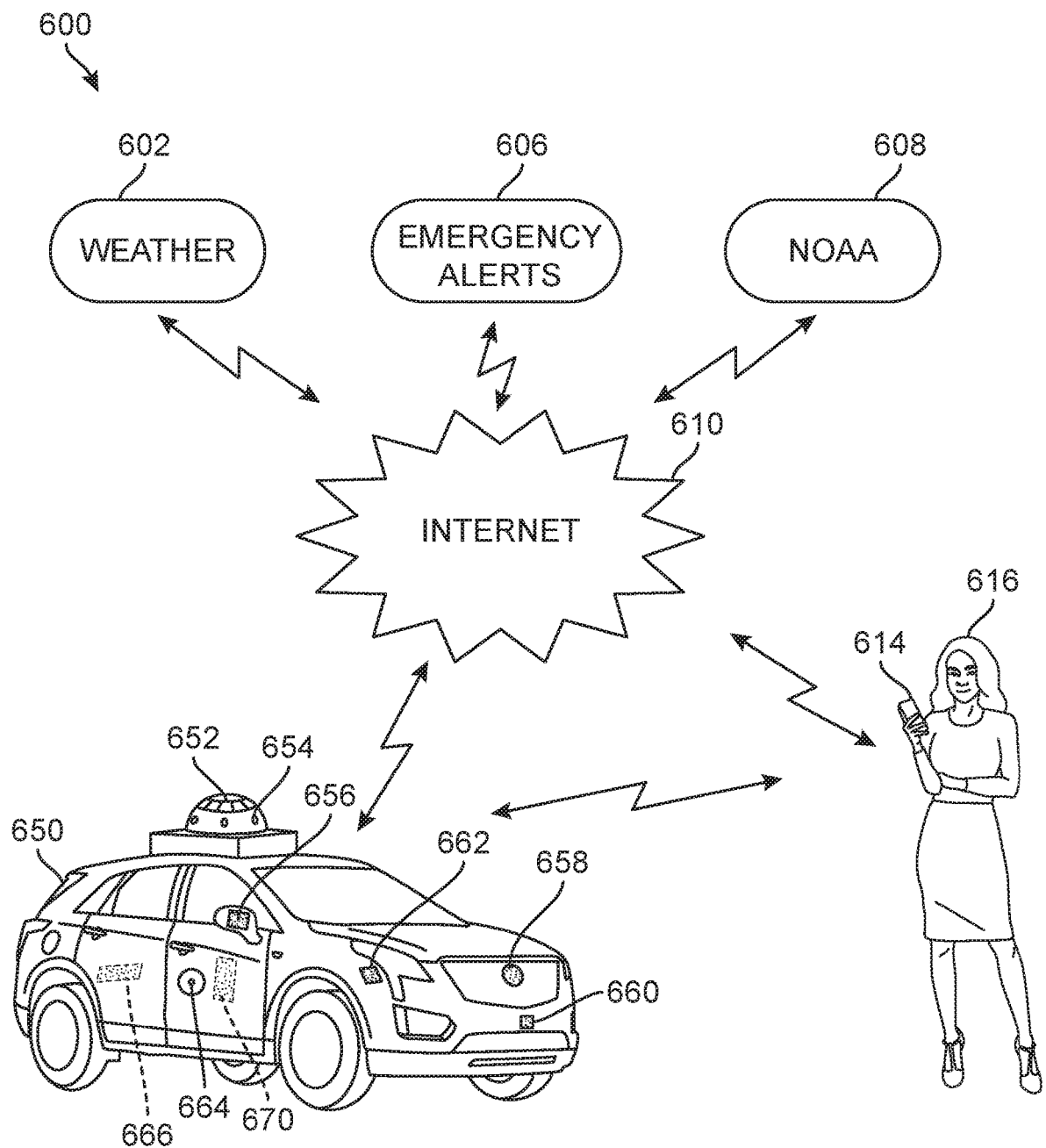
FIG. 6 is a schematic diagram showing exemplary communications between various systems that may be used to mitigate damage, in an embodiment.

In order to implement the embodiments for avoiding hail storm damage disclosed herein, self-driving cars may need to communicate, for example, with various weather reporting systems and with the owner of the self-driving car. FIG. 6 is a schematic diagram 600 showing an example of a self-driving car 650 that is in communication with various sources of weather information and with the car owner 616. For example, the self-driving car 650 may receive notice of an approaching hail storm over the Internet 610, from the Weather Channel 602, from the Red Cross's Emergency Alerts notification system 606 and/or from NOAA 608, for example. It may also receive hail storm warning information directly from local television and/or radio broadcasts, or from satellite communications carrying warnings from any of these weather news sources, and several others as well.

Self-driving car 650 may typically be equipped with various navigation devices to guide the self-driving car to its destination. For example, it may have one or more of LIDAR panoramic unit 652 on its roof, video camera array 654 typically also mounted on the roof of the self-driving car, LIDAR unit 656 on a side view mirror of the car, forward-facing LIDAR unit 658 in the front of the car and possibly another LIDAR unit 660 facing down and ahead of the car. It may also have a microphone 664, either mounted in the car or on the car. Microphone 664 may be used, possibly in conjunction with video cameras, to detect the onset of hail and also to determine whether the hail storm has passed. These devices could then provide navigation data to a computer 666 in the trunk of the self-driving car, for example, or under the back seat. In some embodiments, self-driving car 650 may be in communication with the smart phone (or other personal device) 614 of car owner 616, for example to notify the car owner 616 of its location and/or to request and receive instructions from the car owner.

Communications between self-driving car 650 and Weather Channel 602, the Red Cross's Emergency Alert system 606 and NOAA 608, and the car owner's smart phone or personal device 614 may be transmitted via an electronic device 670 or via the self-driving car's conventional communications systems. The electronic device can then implement the hail storm avoidance procedures described above. Such an electronic device is described in greater detail below with respect to FIG. 11.

Figure 7:
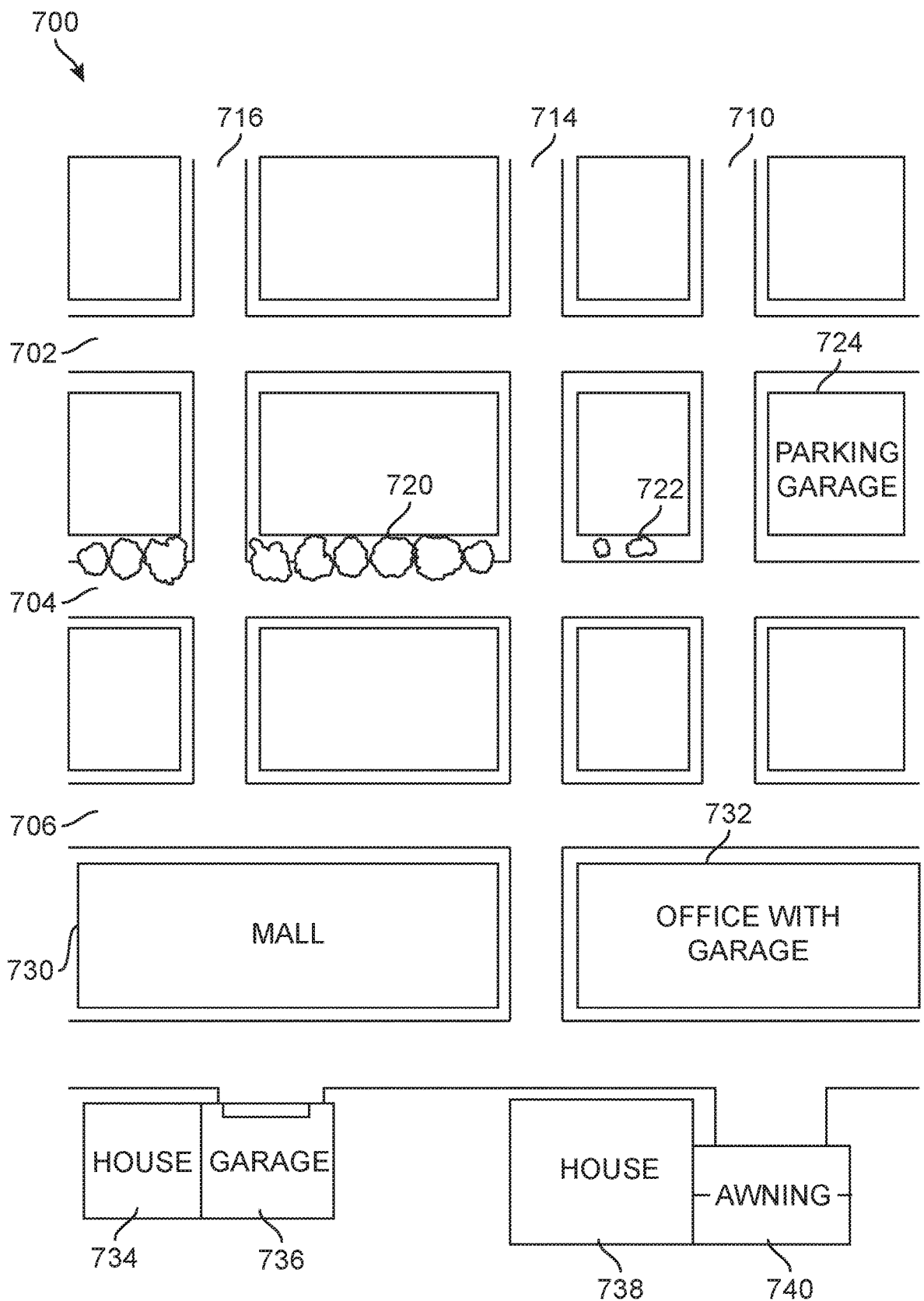
FIG. 7 is a plan view showing examples of shelters that may be used to protect cars or other motor vehicles, in an embodiment.
Figure 8:
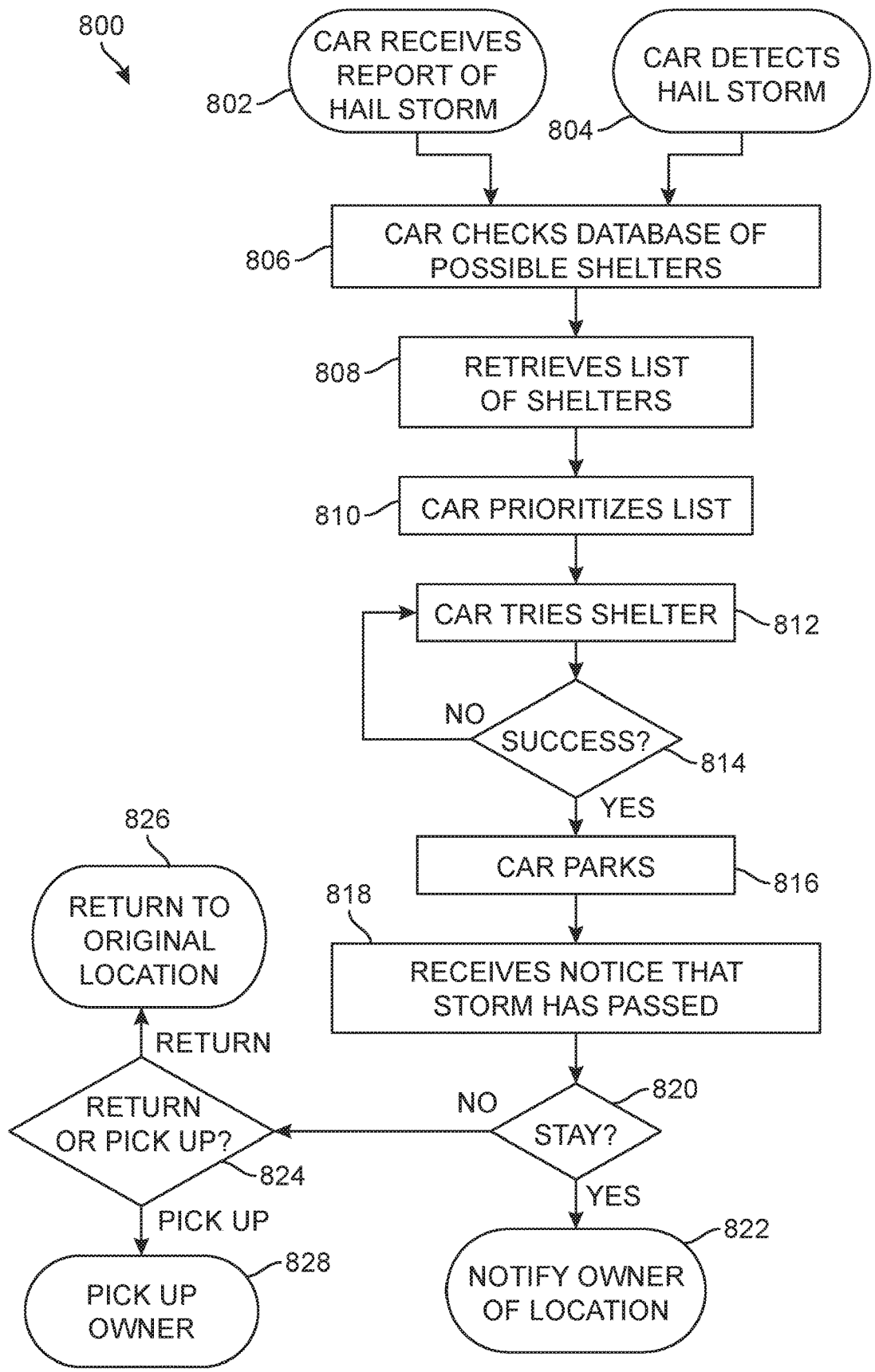
FIG. 8 is a flow chart of an exemplary process for a response by a car or other motor vehicle when a hail storm may be approaching, in an embodiment.

Procedures that may be used so that a self-driving car may find a suitable parking space if no space that is reasonably certain to be available are outlined in FIG. 8, with reference to the exemplary street plan 700 illustrated in FIG. 7. As shown in FIG. 7, the street plan shows several streets, including street 702, street 704, street 706, street 710, street 714 and street 716. Heavy trees 720 and light trees 722 (i.e., trees with only light branches or only a few branches) are located on street 704. In many cases, heavy trees may provide adequate protection from hail, whereas light trees may not. Parking garage 724 is located at the intersections of street 710 with street 702 and street 704. A mall 730 with a parking structure and an office building 732 with parking spaces available to the public are on street 706. Finally, a house 734 with a garage 736 and another house 738 with an awning or car port 740 over its driveway are located on the far side of the mall 730 and the office building 732. Any one of these may prove to be a good target location for a self-driving car in view of the specific severe weather event.

When a self-driving car receives notification that a hail storm may be approaching, or when it actually detects the approach of a hail storm itself, it needs to determine which of the available covered shelters may actually have space for a car. In many cases, there may not be one specific covered structure that is known to be available at all times. Flow chart 800 in FIG. 8 is an example of a process that the self-driving car may use to locate and travel to a covered shelter when a covered shelter is not necessarily known and available. In that case, the self-driving car must figure out where to go.

In the example illustrated in flow chart 800 in FIG. 8, the self-driving car either receives a report of the approaching hail storm in step 802, or detects a hail storm in step 804, or both. It then checks its database of possible covered shelters in step 806 and retrieves a list of covered shelters that are reasonably close to its present location in step 808. The car then prioritizes the list of covered shelters in step 810 using, for example, factors such as the day of the week, the time of the day, the season of the year, whether it is a holiday season, the distance to the shelter in view of the time that the hail is expected to arrive, the wind direction, the condition of the roads and any traffic reports it may have received, for example.

Furthermore, the shelters may also be ranked based upon the type of severe weather that is approaching. For example, if the severe weather is a hail storm, a tornado or a cyclone, the car needs to be in a covered shelter—the top roof of a parking garage may have available parking spaces, but those would not provide protection from a hail storm, a tornado or a cyclone. On the other hand, that top roof may be just fine if the severe weather is a flood, in which case the car needs to be in a high place, whether that high place is above ground level in a public parking garage or up on a hill. In the case of a snow storm, an open parking lot may be a second-best option if space in a covered public garage is not available.

After prioritizing the list of shelters in step 810, the car then tries the first covered shelter on the list in step 812. If the answer to the question of success asked in step 814 is no, the process returns to step 812 to try again at the next possible shelter. In some cases the car may need to evaluate the potential shelter in real time. For example, if the car is evaluating whether to shelter from a hail storm under a tree, it could evaluate whether that tree would provide adequate shelter by analyzing an image of that tree obtained with one of its roof-mounted video cameras. Eventually, if the car succeeds in finding a parking space in that covered shelter, the answer to the question in step 814 is yes, and the car parks itself in step 816. Steps 818, 820, 824, 826 and 828 are optional. If those steps are not followed, the car stays where it is and notifies its owner in step 822 of its location and the identity of the parking structure it is now parked in. If those steps are followed, when the car receives notice that the hail storm has passed in step 818, it may send a message to the card owner in step 820, asking whether it should stay where it is. If the answer is yes, the car stays in the covered shelter and notifies the owner of its location in step 822.

However, if the answer to the question in step 820 is no, the car may ask the car owner another question in step 824—should it return to the car's original location or should it pick up the owner? The car then complies with the car owner's response by either returning the car to its original location in step 826 or driving to the car owner's location to pick up the car owner in step 828.

Figure 9:
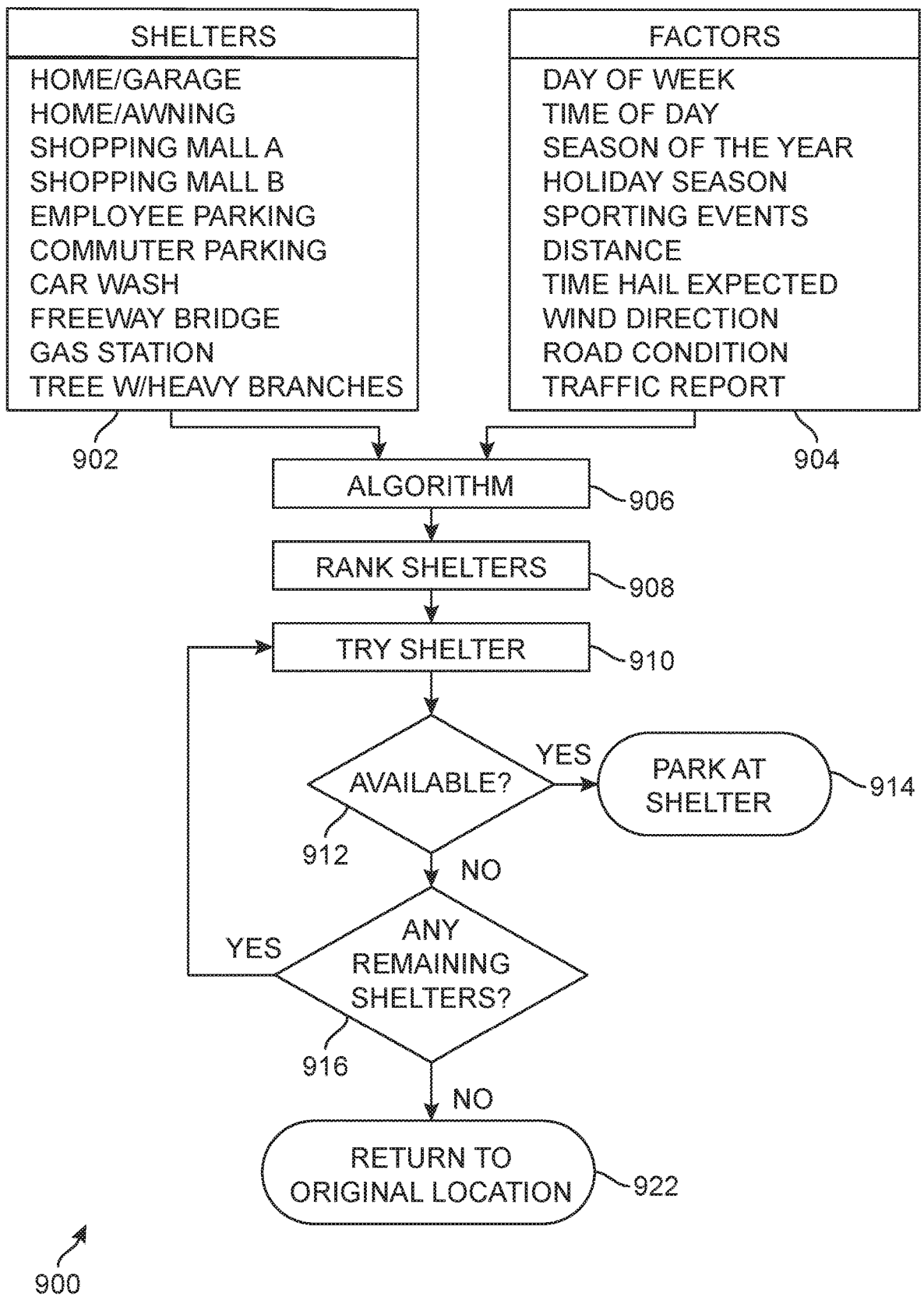
FIG. 9 is a flow chart of an exemplary process that may that may be followed to mitigate damage to motor vehicles, in an embodiment.

FIG. 9 is a further illustration 900 of another process that a self-driving car may be programmed to use to find a parking space that is protected from hail storms. In some embodiments, the car's electronic device, such as the example of such an electronic device shown in FIG. 11, may start with a list of possibly available shelters 902 and a list of factors 904. In step 906, an algorithm then ranks the shelters based upon the factors listed in the list of factors 904, as discussed in the next paragraph.

For example, if the hail storm is less than 10 minutes away, the algorithm would assign a low priority to all shelters more than 10 minutes away, taking into account, for example, other factors such as any traffic reports and road conditions. If the hail storm is approaching during a holiday season when shopping centers are likely to be crowded, shopping malls would also be assigned a low priority. On a weekend, an employee parking garage would likely be assigned a high priority, as would commuter parking, for example. Road conditions may be relevant because if the roads between the self-driving car and a particular protective shelter are icy or snowbound, for example, the self-driving car might be better off staying in its present location.

Other locations such as gas stations, car washes, trees and under freeway bridges would normally be assigned a low priority, unless, for example, they are the only available options that could be reached before the hail storm is overhead. The car may also evaluate the adequacy of a potential shelter in real time on the spot, for example by analyzing images obtained by its video cameras. That evaluation would be useful for sheltering under a tree, as described above, but could also apply to sheltering under a bridge over a highway, for example. Wind direction may be a useful factor; for example, if a strong wind is blowing north to south, the car may seek shelter on the south side of a high wall or building, for example. In some cases, the best course of action might be for the car to drive to the owner's home and park in the home's garage, or under an awning or car port at the home.

After the algorithm has ranked the shelters in step 908, the self-driving car would try the highest-ranked shelter in step 910. In step 912, the self-driving car determines whether space is available at the shelter, for example by driving through the shelter looking for available spaces. If a space is available at that shelter, the car would park itself in step 914 and notify the car owner of its location. If that shelter is full, the car checks if there are any other shelters that it has not tried yet in step 916. If there are one or more remaining shelters, the car then returns to step 910 to try the next shelter on the list. If there are no shelters left, the car may return to its original location in step 922.

Figure 10A:
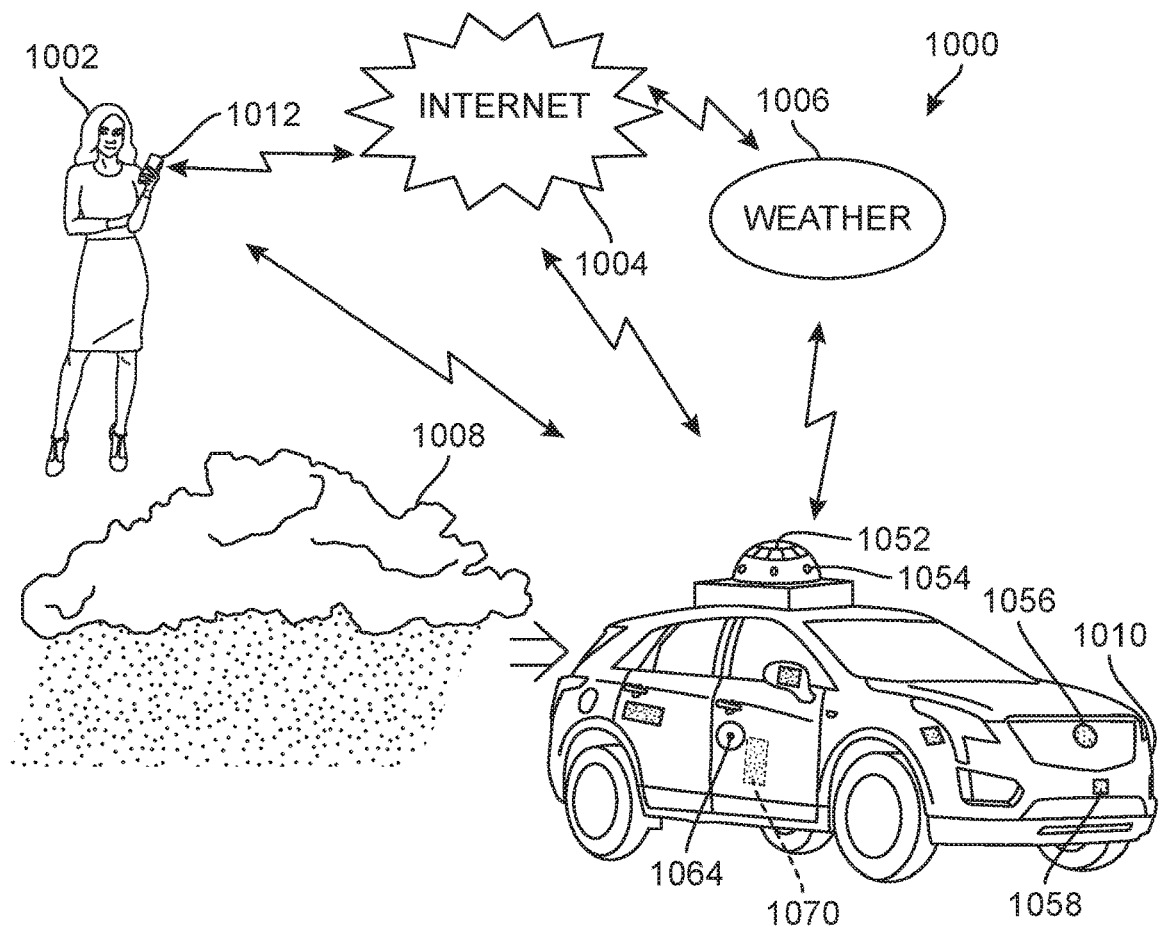
FIG. 10A is a schematic diagram showing communication with a motor vehicle while a hail storm approaching, in an embodiment.

FIG. 10A is a schematic illustration 1000 of a scenario in which self-driving car 1010 receives its notification of an approaching hail storm 1008 directly from a weather reporting channel 1006 rather than via the Internet. Weather reporting channel 1006 may be a local radio station, a NOAA broadcast, an Emergency Alert from an organization such as the Red Cross, or some other weather reporting system. The self-driving car may be in communication over the Internet 1004 with car owner 1002 over her smart phone 1012, so that it can request and receive instructions, as described below with reference to FIG. 10B. As in the example illustrated in FIG. 6, self-driving car 1010 has a LIDAR unit 1052 on its roof, video cameras 1054 integrated with the roof LIDAR unit, a forward-looking LIDAR unit 1056 in its grille and another LIDAR unit 1058 pointing down to the road, as well as other LIDAR and radar units placed at various positions around the car. It has a microphone 1064 mounted on an exterior surface, in this example on the exterior surface of the front passenger door. It also has an electronic device 1070 that may be similar to the electronic device illustrated in FIG. 11.

Figure 10B:
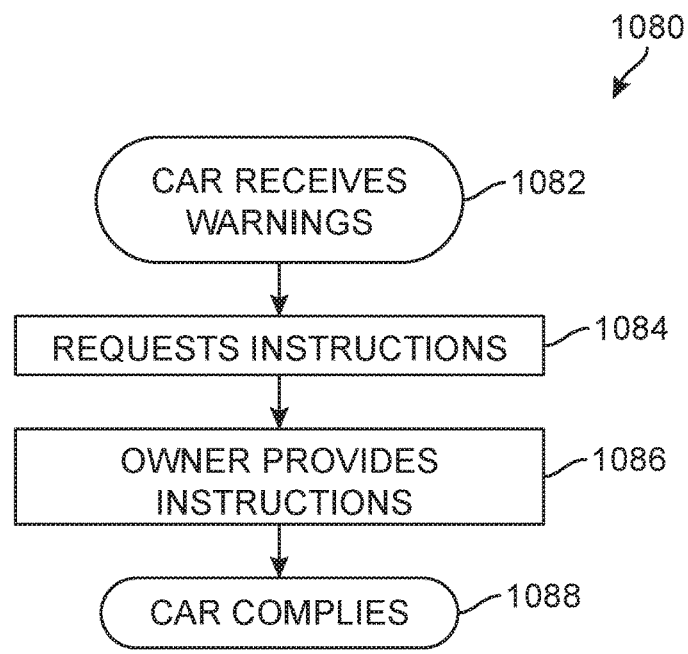
FIG. 10B is an exemplary flow chart showing how the motor vehicle of FIG. 10A may respond to a notification that a hail storm may be approaching, in an embodiment.

FIG. 10B is an exemplary flow chart 1080 of a process that the self-driving car 1010 might follow. In this example, rather than relying on an algorithm to identify a shelter, the self-driving car simply asks the car owner where to go. Once it receives warnings of an approaching hail storm in step 1082, it may request specific instructions from the car owner in step 1084. The car owner then provides those instructions in step 1086, and the car complies in step 1088. For example, the car owner may instruct the car to drive home and park in the home's garage, under an awning or in a carport. The car owner may also have knowledge of a specific covered parking structure that he or she may know would have parking spaces available at that time and may therefore instruct the self-driving car to go there. For example, the car owner may instruct the car to go to an employee parking garage, to a parking structure at a mall, or to an open public parking garage. The car owner may further instruct the car to stay in its sheltered location in the covered parking structure until it receives further instructions or until the car owner comes to pick the car up.

Figure 11:
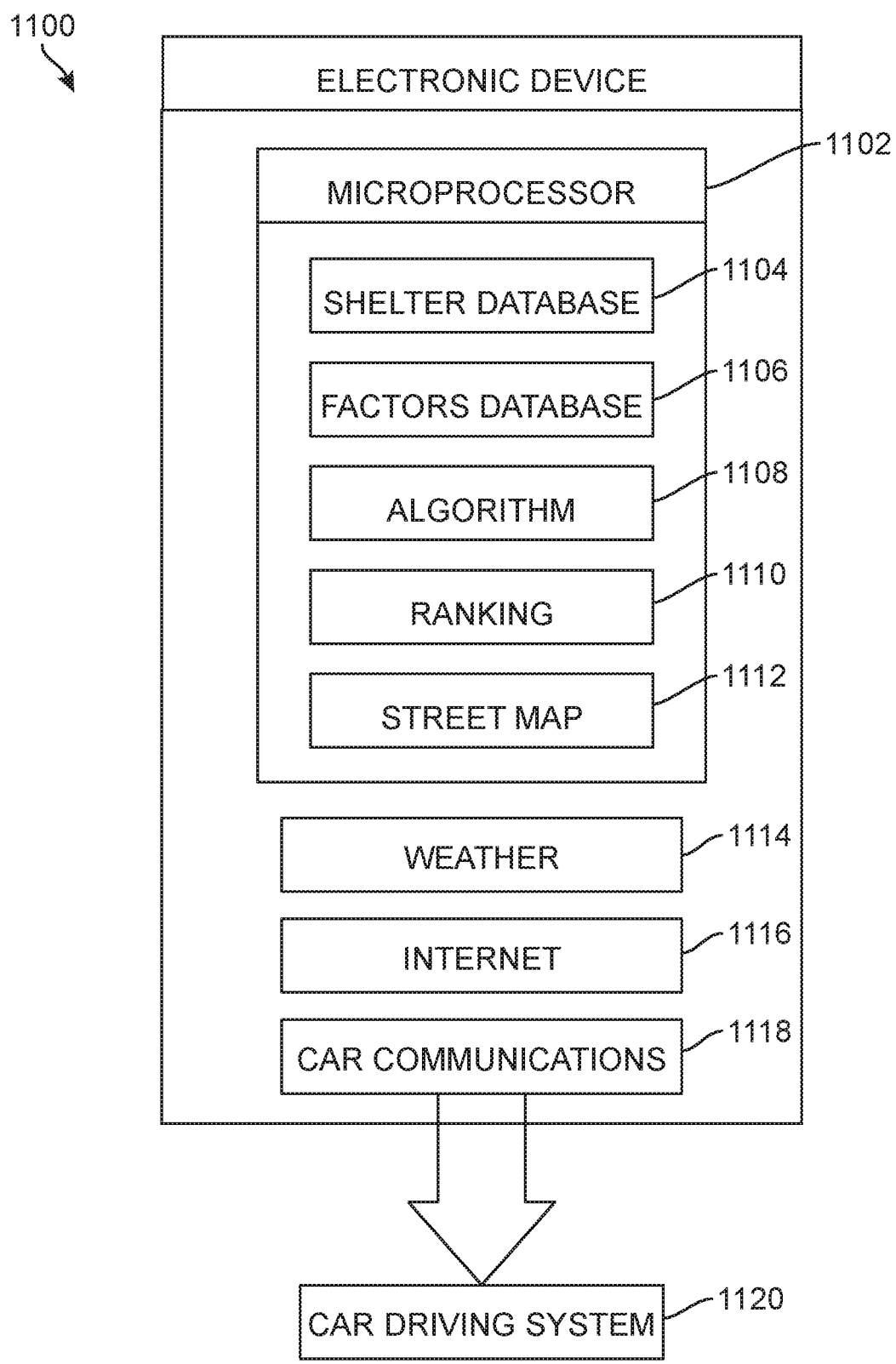
FIG. 11 is a schematic block diagram of an electronic device that may be used to implement mitigation tactics in response to the imminent arrival of a hail storm, in an embodiment.

FIG. 11 is an illustration of an electronic device that might be used to implement the embodiments described above. Exemplary electronic device 1100 has a microprocessor 1102 and three communications modules. Weather communications module 1114 may be used to communicate with any of the weather reporting sources described above, either via the Internet using module 1116 or via a direct broadcast, for example. Car communications module 1118 provides destination and other driving instructions to the self-driving car's driving and navigation system 1120. Car communications module 1118 may also communicate with the car owner and with weather reporting systems through the Internet and/or through a cellular phone network, a satellite network or other network. Within microprocessor 1102, shelter database 1104 and factors database 1106 may be used by algorithm 1108 to prioritize and rank the available shelters. The results can then be stored in a ranking database 1110. Algorithm 1108 may use street map database 1112 as well as shelter database 1104 and factor database 1106 to compile its ranking of available shelters. Thus electronic device 1100 functions to (1) enable communications with weather reporting sources and with the car owner; (2) determine which covered parking shelters may be available and prioritize and rank those parking shelters; and (3) provide instructions to the car's driving system.

Figure 12:
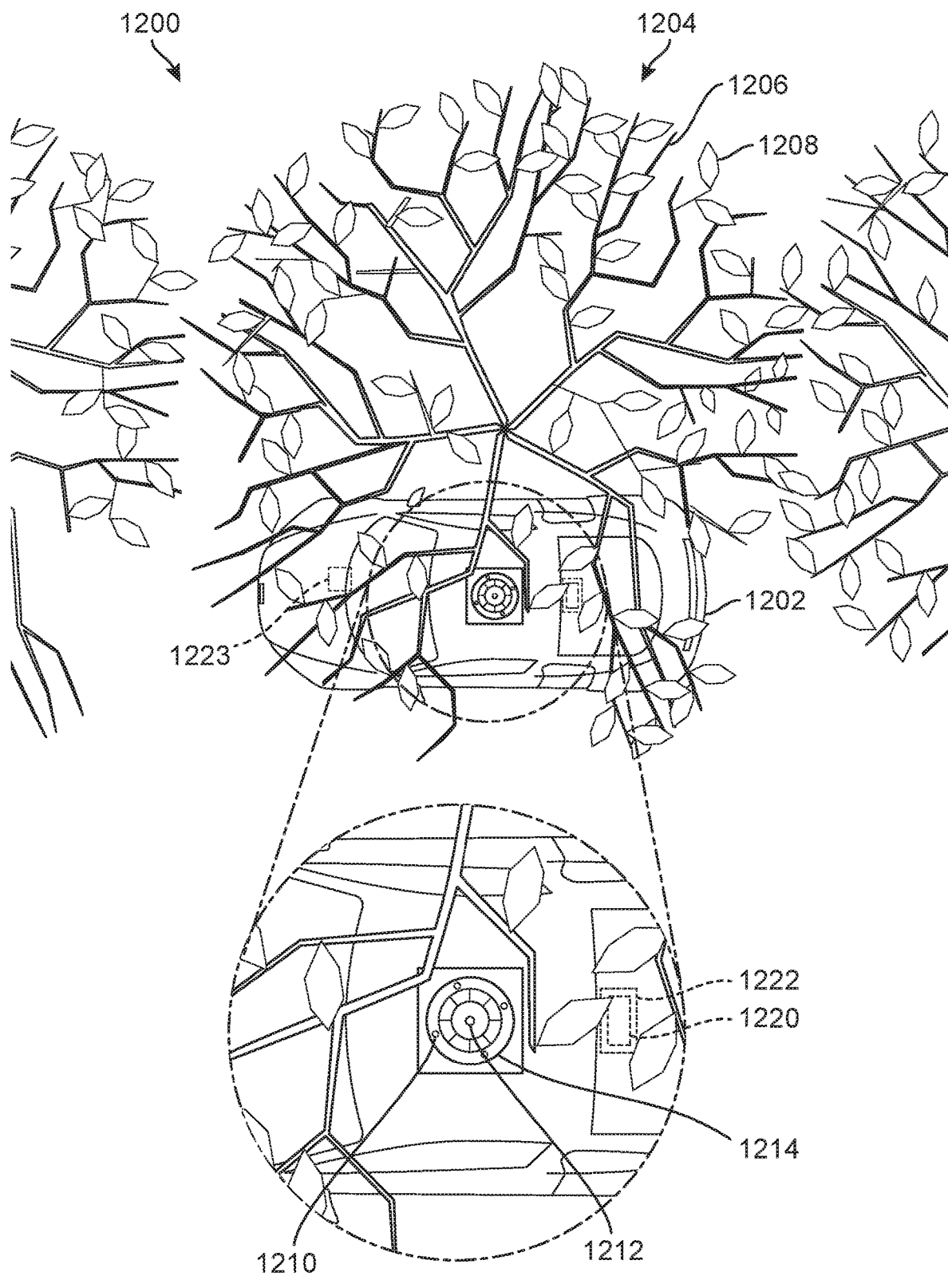
FIG. 12 is an exemplary schematic illustration of a self-driving car seeking shelter under a tree, in an embodiment.

FIG. 12 is a schematic illustration 1200 of self-driving car 1202 that has reached a potential shelter under a tree 1204. The self-driving car has been directed to find shelter under that tree 1204 by an electronic device (such as electronic device 1100 shown in FIG. 11). The tree includes branches 1206 and leaves 1208 that provide some level of protection. However, in this case, during a hail storm, those branches and leaves are not providing adequate shelter for the car. As in the example illustrated in FIG. 6, self-driving car 1202 has a LIDAR unit 1214 on its roof and lateral-facing video cameras 1210 around the perimeter of the LIDAR unit. These lateral-facing cameras 1210 are integrated with the LIDAR unit. In this embodiment, self-driving car 1202 also has an upward-facing video camera 1212 on the top of the LIDAR unit, which is also integrated with the LIDAR unit. In some embodiments, upward-facing camera 1212 uses a wide-angle lens. Upward-facing video camera 1212 captures images of the protective overhead coverage provided by tree 1204 at the car's current location. An analysis unit 1220 analyzes the images to evaluate the tree's ability to protect the car from oncoming hail. Analysis unit 1220 may be in communication with the self-driving car 1202's navigation unit 1223, in some embodiments. In some cases, analysis unit 1220 is an app operating in a computer 1222 that is installed in the car, as illustrated in FIG. 12.

In this example, the images show significant gaps and openings between the tree's branches and leaves. Given the lack of sufficient overhead coverage, the analysis unit would determine that parking under tree 1204 might leave the car vulnerable to damage from hail and direct the car to relocate to more appropriate shelter. The analysis unit may monitor weather reports, weather alerts, road conditions, and traffic reports in deciding where to go. The analysis unit may be located in the trunk or under the rear seat. It may be an app installed in an onboard computer (such as computer 1222 shown in FIG. 12) or it may be an app installed on a mobile phone in the vehicle. Analysis unit 1220 may communicate with the car's self-driving mechanism and with a navigation unit 1223 in the car via Bluetooth, another wireless communication means, or via a hardwired connection. It may also be integrated into the same computer as the self-driving mechanism and the navigation unit.

Figure 13:
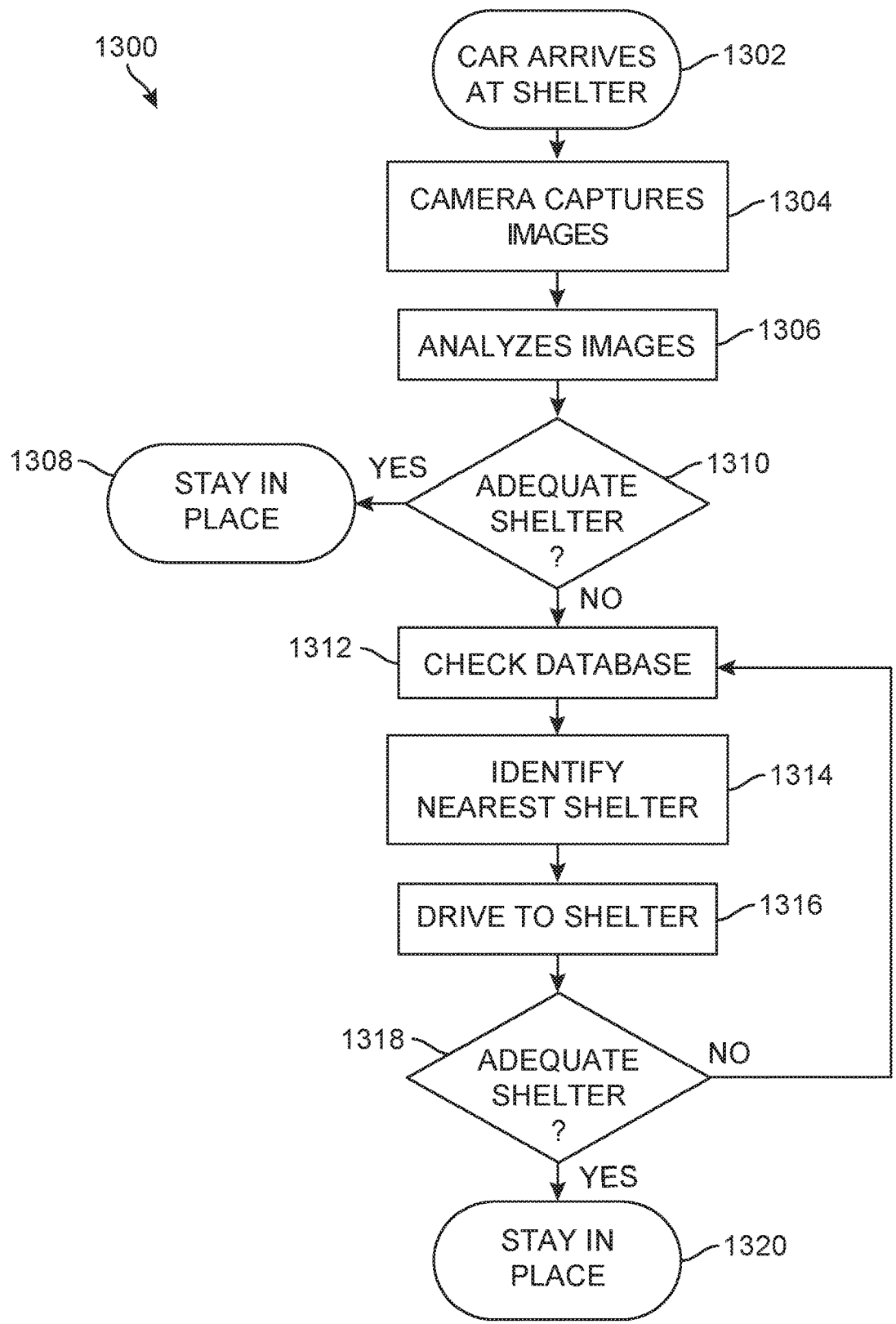
FIG. 13 is an exemplary flow chart showing how an analysis unit in a motor vehicle may evaluate a shelter, in an embodiment.

FIG. 13 is an exemplary flow chart 1300 showing how the motor vehicle of FIG. 12 may evaluate a shelter during a hail storm, in an embodiment. At step 1302 the car arrives at the shelter and starts monitoring its environment using, for example, upward-facing camera 1212 shown in FIG. 12. At step 1304 the upward-facing video camera mounted on top of the vehicle captures images of the coverage provided by the shelter. The images are analyzed by an analysis unit at step 1306. If at step 1310, the analysis unit determines that the shelter is adequate, the car stays in place as shown by step 1308. If at step 1310 the analysis unit determines that the shelter is not adequate, the car checks the database for other shelters at step 1312. At step 1314 the car identifies the nearest available shelter and at step 1316 the car drives there. At step 1318 the analysis unit evaluates the new shelter. If the new shelter is adequate, at step 1320 the car stays in place (and possibly reports its location to its user). If the shelter is not adequate, the car returns to step 1312 to check the database, identifies the nearest shelter from this new location in step 1314, and drives to the shelter in step 1316. The process can repeat until the car finds adequate shelter or the severe weather threat is over.

Figure 14:
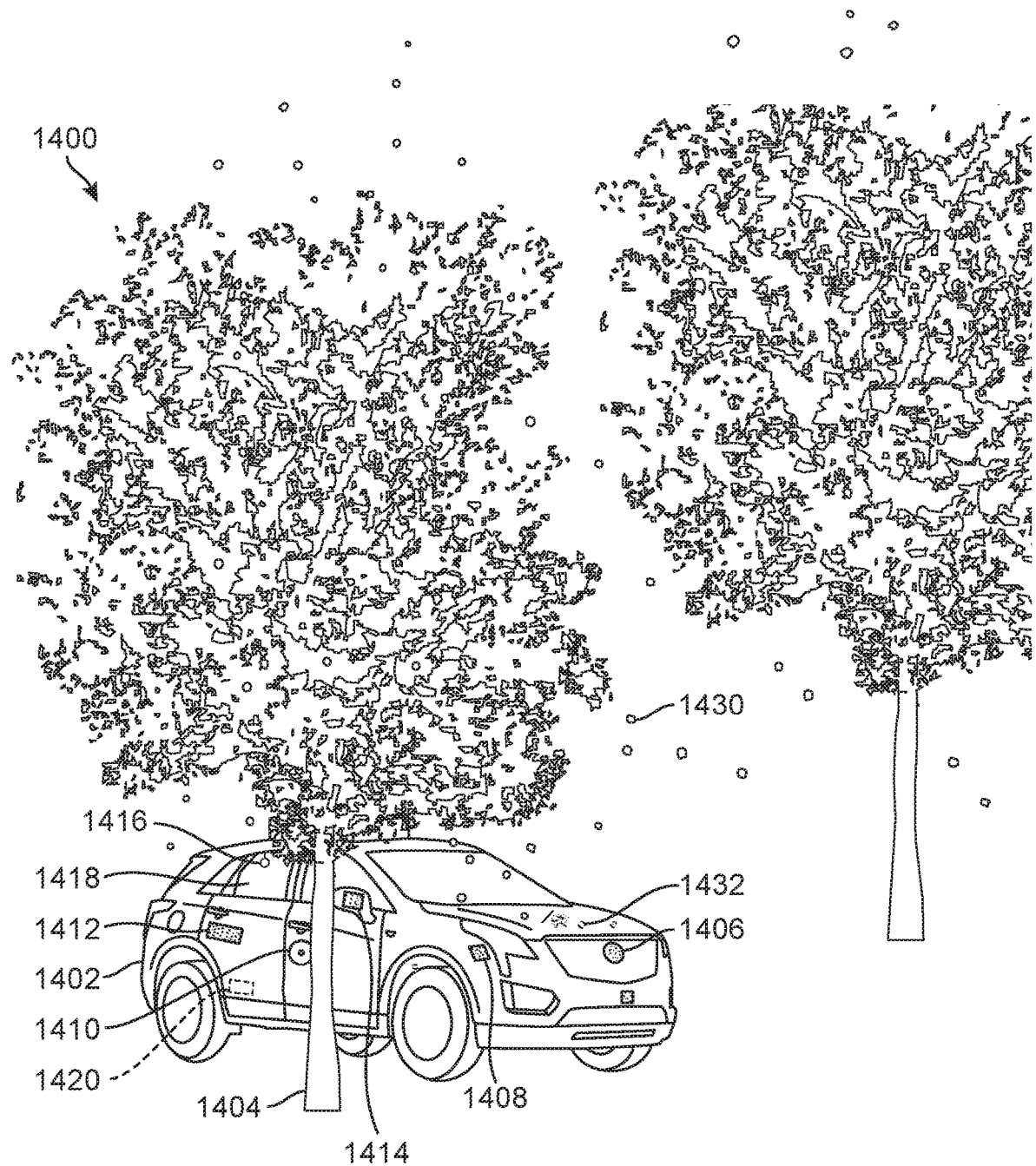
FIG. 14 is a schematic illustration of a self-driving car seeking shelter under a tree, in another embodiment.

FIG. 14 is a schematic illustration 1400 in which a self-driving car 1402 is underneath a tree 1404 during a hail storm. Hail 1430 is falling through tree 1404 and hitting the car. In some cases, the hail has been sufficiently slowed down by the branches and leaves of the tree that it does not cause any damage. In other cases, the hail 1430 has hit the self-driving car with sufficient force to produce dents 1432. In the example shown in FIG. 14, the only dents are on the hood of self-driving car 1402, so in that case, if the self-driving car can find adequate shelter somewhere else, the damage may be restricted to just the hood of the car.

As in the example illustrated in FIG. 6, self-driving car 1402 may have a forward-looking LIDAR unit 1406 in its grille, as well as other LIDAR units 1408 on the car's fender, LIDAR unit 1412 on a door, and a LIDAR unit 1414 on a side view mirror. In this embodiment, the car may have one or two or more recording microphones, such as recording microphone 1410, which is located on the outside of the vehicle and recording microphone 1416, which is located within passenger compartment 1418. The recording microphones may record sounds within the car and in the vicinity of the car. When either microphone senses sound, an analysis unit 1420 analyzes the sound to identify whether it is hail striking the vehicle. The analysis unit determines if the sound is hail striking the vehicle based on the characteristics of the sound and comparing it to known sounds of hail striking a vehicle. Based on the analysis, the vehicle may decide to seek alternative shelter.

Figure 15:
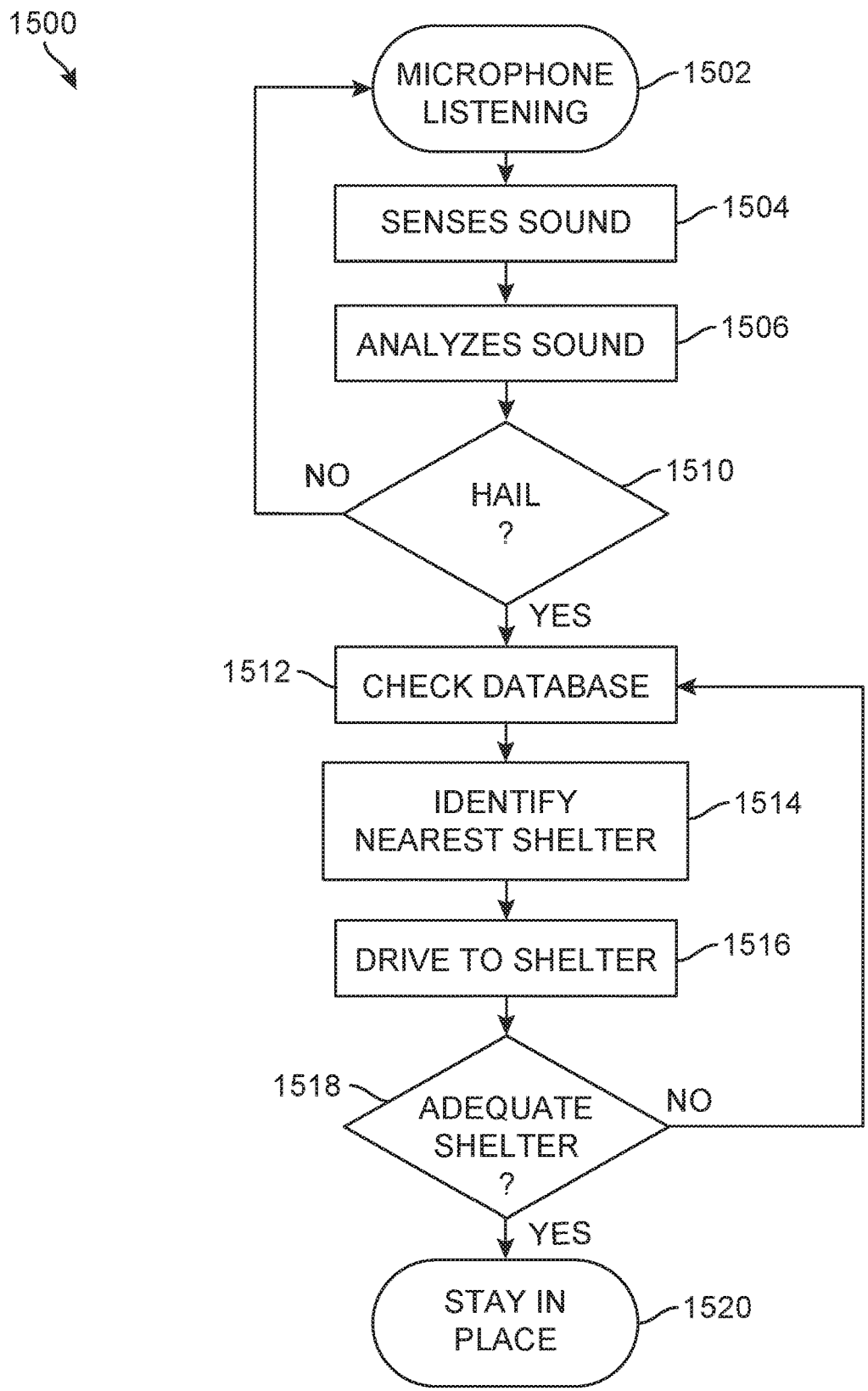
FIG. 15 is an exemplary flow chart showing how an analysis unit in a motor vehicle may evaluate a shelter, in another embodiment.

FIG. 15. is an exemplary flow chart 1500 showing how the self-driving motor vehicle of FIG. 14 may evaluate a shelter using recording microphones. At step 1502, when the self-driving vehicle has reached its potential shelter, the interior and/or exterior recording microphones listen for sounds. At step 1504 the microphones sense sounds and may record those sounds. At step 1506 the analysis unit analyzes the sounds. At step 1510 the analysis unit determines whether the sound is hail striking the vehicle. If it does not identify the sounds as hail, it returns to the listening mode of step 1502. Otherwise, if at step 1510 it identifies the sounds as hail striking the car, then at step 1512 it checks its database for another shelter. At step 1514 the analysis unit identifies the next nearest shelter in the database and at step 1516 the car drives to that shelter. At step 1518 the self-driving car evaluates the new shelter and determines whether or not it provides adequate shelter. If the new shelter provides adequate shelter, the car stays in place at step 1520. If not, the car returns to step 1512 to check the database for another nearby shelter.

In some of the embodiments that use one microphone within the car's passenger compartment and one exterior microphone, the two microphones may work together. The exterior microphone may be attached to an exterior surface of the motor vehicle. In such embodiments, the two sets of sounds may be analyzed separately by the analysis unit, or the analysis unit may first combine the two sets of sounds and then carry out the analysis on the combined data. In other embodiments, the microphones may work separately. In such embodiments, the sounds may be analyzed independently. The analysis unit may then determine whether the shelter is adequate if the sounds from either the interior or the exterior microphones lead to a determination that hail may be hitting the car, or may be hitting very close to the car.

In some embodiments, sounds recorded from microphones associated with the LIDAR video cameras may be used instead of or in combination with the passenger compartment and/or exterior microphones described above and illustrated schematically in FIG. 14. In those embodiments, the sounds may be recorded in association with the LIDAR unit(s) or may be recording in a separate recording device that is itself in communication with the analysis unit.

In some embodiments, the analysis unit may have stored recordings of the sounds hail may make when hitting the exposed surfaces of cars. The analysis unit may then compare the sounds recorded by the recoding microphone to those previously-stored sounds as part of its determination as to whether the presently recorded sounds are due to hail striking exposed surfaces of the car. If the sounds match within a pre-determined threshold, the analysis unit would conclude that the shelter is not adequate, and would direct the car to another shelter, as discussed above.

The same procedures may be used in other cases of severe weather. For example, if the severe weather is a flood, the self-driving car would need to look for a location that is well above the predicted flood level. In that case, if the self-driving car has been directed by an electronic device (such as electronic device 1100) to the first floor of a parking garage that is open between levels, the analysis unit may determine that this is not a good place to be by analyzing images of flood water accumulating in the garage. The analysis unit may then direct car to check its database for a more effective shelter, using steps similar to steps 1512-1520 of FIG. 13. The car would then drive itself to the more effective shelter. In a parking garage example, the car may simply be directed to find a parking spot at an upper level of the parking garage. In another example, if the upper levels of the garage are full, the analysis unit may direct the car to drive itself to a higher elevation, such as the top of a hill.

The embodiments described above may also be applied in other situations in which it may be desirable to move a motor vehicle into a parking garage or other location. For example, if heavy flooding is predicted, or if a heavy snow storm is approaching, it may be beneficial to move the motor vehicle to a safer location. Flooding may cause severe damage to a motor vehicle, and if mold develops, the motor vehicle may need to be thoroughly cleaned. In the case of a snow storm, moving a motor vehicle may prevent it from being damaged by a vehicle whose driver has lost control in the snow. In another example, motor vehicles left on the street during a snow storm may get damaged by a snow plow. Motor vehicles may get towed away (and possibly damaged) because they are parked on a road that requires removal of motor vehicles when a snow storm is predicted. Motor vehicles may also be damaged during tornadoes or cyclones, either by being hit by flying debris or in extreme cases by being physically lifted or overturned by the tornado or cyclone.

The embodiments described above allow self-driving cars to avoid damage due to hail storms and other severe weather events. This avoids inconvenience to the car owners and results in substantial savings to car insurance companies. The lower expenses that insurance companies have to incur due to hail storms then further results in lower insurance premiums to their subscribers, thus eventually providing substantial savings to all subscribers. Also, although the flow charts in FIG. 5, FIG. 8, FIG. 9, FIG. 10B, FIG. 13 and FIG. 15 provide examples of how damage to motor vehicles due to severe weather may be mitigated, those flow charts are examples only, and many other procedures may be used to execute the embodiments disclosed herein.

While various embodiments have been described above, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A system for mitigating damages caused by severe weather comprising:
    a self-driving motor vehicle that comprises a self-driving system and a microprocessor;
    the self-driving motor vehicle further comprising at least one of a video camera and a recording microphone;
    wherein the self-driving motor vehicle is configured to drive itself to a potentially sheltered location upon learning of an arrival of severe weather;
    wherein when the self-driving motor vehicle has arrived at the potentially sheltered location, the microprocessor is configured to analyze at least one of images captured by the camera and sounds recorded by the recording microphone and to determine whether the potentially sheltered location provides adequate shelter for the self-driving motor vehicle; and
    wherein the microprocessor is configured to direct the self-driving system to drive the self-driving motor vehicle from the potentially sheltered location to a more protective shelter whenever the microprocessor determines that the potentially sheltered location provides inadequate shelter.

2. The system of claim 1, wherein the severe weather is hail.

3. The system of claim 1, wherein the video camera is pointing upwards from a roof of the self-driving motor vehicle to capture images of any shelter above the self-driving motor vehicle.

4. The system of claim 1, wherein the recording microphone is positioned within a passenger compartment of the self-driving motor vehicle.

5. The system of claim 1, wherein the recording microphone is mounted on the self-driving motor vehicle on an exterior surface of the self-driving motor vehicle.

6. The system of claim 1, wherein the microprocessor is configured to determine that hail is striking the self-driving motor vehicle by comparing sounds recorded by the recording microphone to previously recorded sounds.

7. The system of claim 1, wherein the severe weather results in flooding, and wherein the microprocessor is configured to determine that the self-driving motor vehicle should drive itself to a more protective shelter whenever it determines that water is flowing towards the self-driving motor vehicle.

8. A method for mitigating damages from severe weather to self-driving motor vehicles comprising:
    providing a self-driving motor vehicle equipped with a LIDAR unit and a navigation apparatus;
    directing the self-driving motor vehicle to a first potentially sheltered location;
    providing at least one of a camera configured to capture images of a view above the motor vehicle and a recording microphone associated with the self-driving motor vehicle configured to record sounds from around the self-driving motor vehicle;
    providing an analysis unit configured to analyze at least one of the images captured by the at least one camera and the sounds recorded by the recording microphone, and to determine whether the self-driving motor vehicle is not being adequately sheltered at the first potentially sheltered location; and
    wherein whenever the analysis unit is not being adequately protected at the first potentially sheltered location, the analysis unit directs the self-driving motor vehicle to drive to a second potentially sheltered location.

9. The method of claim 8, wherein the severe weather is a hail storm.

10. The method of claim 8, wherein the self-driving motor vehicle has arrived at the first potentially sheltered location prior to the arrival of a hail storm, and wherein the analysis unit determines that the motor vehicle is not being adequately sheltered at the first potentially sheltered location based at least in part upon an analysis of the images captured by the camera.

11. The method of claim 8, wherein the self-driving motor vehicle has arrived at the first potentially sheltered location after the arrival of a hail storm, and wherein the analysis unit determines that the motor vehicle is not being adequately sheltered at the first potentially sheltered location based at least in part upon an analysis of the sounds recorded by the recording microphone.

12. The method of claim 11, wherein the analysis unit determines that hail is impacting the vehicle by comparing the sounds recorded by the recording microphone to previously recorded and stored sounds of hail striking vehicles.

13. The method of claim 8, wherein after the severe weather is over, the self-driving motor vehicle notifies an owner of the self-driving motor vehicle of its final location.

14. The method of claim 8, wherein the severe weather results in flooding, and wherein the analysis unit determines that the first potentially sheltered location is not adequate because it determines that flood water is approaching the first potentially sheltered location.

15. A system for mitigating damage caused by severe weather comprising:
   a self-driving motor vehicle that comprises a LIDAR unit comprising lateral-facing cameras on its roof;
   a microprocessor in communication with a navigation unit in the self-driving motor vehicle and with a database of potentially protective shelters;
   the self-driving motor vehicle further comprising at least one of an upwards-facing camera mounted in the LIDAR unit and a recording microphone;
   wherein the self-driving motor vehicle is configured to monitor at least one of weather reports and weather alerts and to drive itself to a potentially protective shelter whenever it learns of approaching severe weather;
   wherein the microprocessor is configured to analyze at least one of images captured by the camera and sounds recorded by the recording microphone to determine whether the potentially protective shelter provides adequate protection from the severe weather; and
   wherein when the microprocessor determines that the potentially protective shelter is not adequate, it retrieves information from the database of potentially protective shelters, identifies a specific protective shelter that would provide adequate protection, and instructs the self-driving motor vehicle to drive itself to that specific protective shelter.

16. The system of claim 15, wherein the severe weather is hail.

17. The system of claim 16, wherein the potentially protective shelter is a tree, and the microprocessor is configured to determine that the tree does not provide adequate shelter when the microprocessor identifies gaps between branches of the tree in at least one image captured by the upwards facing camera.

18. The system of claim 16, wherein the microprocessor determines that the potentially protective shelter is inadequate based upon characteristics of sounds recorded by the recording microphone.

19. The system of claim 16, wherein the microprocessor is configured to determine whether hail is striking a surface of the self-driving vehicle by comparing the sounds recorded by the recording microphone to previously recorded sounds of hail striking a vehicle surface that are stored within a database of sounds associated with the microprocessor.

20. The system of claim 15, wherein the severe weather is a flood, and the microprocessor is configured to determine that the potentially protective shelter is inadequate based upon images of water flowing into the potentially protective shelter captured by at least one of the lateral-facing cameras.

* * * * *